United States Patent [19]

Rish

[11] Patent Number: 5,781,117
[45] Date of Patent: Jul. 14, 1998

[54] WATER LEVEL DETECTOR ALARM DEVICE

[76] Inventor: Thomas L. Rish, 2405 Formosa Dr., Tallahassee, Fla. 32308

[21] Appl. No.: 753,276

[22] Filed: Nov. 22, 1996

[51] Int. Cl.[6] .................................................. G08B 21/00
[52] U.S. Cl. ........................... 340/618; 340/623; 340/625; 200/84 R
[58] Field of Search .................... 340/618, 623, 340/624, 625; 73/308, 311, 317; 200/84 A, 84 C, 61.2, 61.52

[56] References Cited

U.S. PATENT DOCUMENTS

| | | | |
|---|---|---|---|
| 3,662,131 | 5/1972 | Leistiko | 340/623 |
| 4,169,261 | 9/1979 | Alpaugh | 340/618 |
| 4,223,190 | 9/1980 | Olson | 200/84 R |
| 4,467,156 | 8/1984 | Dvorak et al. | 200/84 R |
| 4,778,957 | 10/1988 | Crowell | 340/625 |
| 4,800,372 | 1/1989 | Poteet | 340/625 |
| 4,879,545 | 11/1989 | Aguilar | 340/624 |
| 4,973,947 | 11/1990 | Tax | 340/618 |
| 5,283,569 | 2/1994 | Nelson | 340/623 |
| 5,294,917 | 3/1994 | Wilkins | 340/625 |
| 5,581,062 | 12/1996 | Comez, Jr. | 340/625 |

OTHER PUBLICATIONS

*Camping World®*, p. 9, item D, Awning Arms Anchors, 1996.
Delson Industries, Inc., Sure Bail® Automatic Float Switch, warranty and instruction sheet, purchased 1996.
Rule Industries, Inc., High Water Alarm, installation instructions, purchased 1996.

*Primary Examiner*—Jeffery Hofsass
*Assistant Examiner*—Van T. Trieu
*Attorney, Agent, or Firm*—Carnes Cona Dixon

[57] ABSTRACT

The present invention is a water level detector or flood alarm device which will activate a warning once water has reached a pre-determined and potentially damaging or dangerous level. The present invention comprises a housing which maintains a conventional mercury activated float switch, an alarm coupled to the switch, a mounting device, and an attaching mechanism. The mounting device maintains the housing and includes a pivotal mechanism for enabling the housing to pivot and rotate. This pivoting and rotation will allow the housing to be angularly positioned, with respect to the ground, so that the float switch will be positioned horizontally and parallel with respect to the water. The attaching mechanism enables the device to be removably secured to any surface and to be maintained in a secured and installed position.

21 Claims, 5 Drawing Sheets

WATER LEVEL DETECTOR ALARM DEVICE

BACKGROUND OF THE INVENTION

1. Field of the Invention

The present invention relates generally to a water level detector or flood alarm device and more particularly to a substantially compact, lightweight, portable and versatile water level detector or flood alarm device which is adapted to be installed permanently or removably secured to any surface, terrain, or the like, at any angular position, for enabling an accurate and adequate placement of the device for successfully activating a warning means should the water reach a predetermined and potentially damaging or dangerous level.

2. Description of the Prior Art

Throughout the United States, it is well known that low lying areas are often susceptible to unexpected flooding during severe rainstorms and hurricanes. There are many homes today which are along the coast and located near low lying rivers, lakes, and ponds. Often the flooding occurs so rapidly or at night that the residents of these homes do not have sufficient time to remove or protect their valuables, and at times, themselves from the rising water. Many lose most, if not all, of their personal possessions, including their homes. This can be financially devastating, especially for those who do not have flood insurance. Some, unfortunately, may even lose a loved one or their own life during a flash flood. Consequently, there is a need for an alarm system which would activate a warning means prior to a potentially damaging or dangerous flood. Such an alarm system would not only save lives, but will also allow residents to remove themselves and possibly their valuable possessions, to a safer and more secure area.

Campers, boaters, armed forces, canoeing and rafting outfitters, and other businesses with temporary or permanent operations near a river are even more vulnerable to the dangers of flood conditions. They and their equipment are typically located at lower elevations much closer to the water's edge and usually are more exposed to adverse weather elements. The risk of danger is even greater in low areas that are subject to flash floods which can occur without warning in just a few hours, or sometimes minutes, at any time day or night, and even under clear skies when heavy rainfall has occurred upstream. People exposed to this type of risk usually would not be able to receive local radio or television flood warnings even if any were issued, and therefore, have a dire need to be forewarned as early as possible about any significant trend of rising water levels so they can increase vigilance, move to higher ground, or evacuate.

And finally, disaster aid and rescue workers often become victims themselves because they have no way to be forewarned when flood waters suddenly rise in their local working area, ruining their equipment and supplies and stranding them. Accordingly, there is a need for a lightweight, compact, portable alarm system which will adequately warn users of potential flood conditions and possibly save their personal belongings, equipment, and lives.

A flood alarm is disclosed in U.S. Pat. No. 4,800,372 issued to Poteet. Though not truly portable, this device does allow a means of warning users of a potential flood. The device comprises a mercury activated float switch pivotally positioned within a slot of a pipe which is mounted to a weighted base. Once water reaches a preselected level, the switch closes for activating a warning means. The design and configuration of the pipe and the base provides for an alarm which is limiting in utility. Due to the bulkiness of the pipe and the weight of the base, such an alarm could not be considered truly portable, thereby confining its use and providing a system which is permanently located. Additionally, the size, shape and design of Poteet's sensor unit also severely limits precisely where it can be placed. Since the float switch must remain approximately horizontal, the large base of Poteet's sensor must be positioned on relatively level ground; but on most rivers the sides of the river bed are very steep and the banks are often high, so level conditions rarely prevail in a non-developed or natural environment anywhere except high on the bank or near the middle of the channel. But placing the sensor in the middle of the channel is generally impractical, and placing the sensor on the bank high above the normal water level provides little or no warning prior to the onset of flood conditions when the river banks overflow.

To provide the most warning time, the conventional sensor of any water level detector device must be positioned very close to the existing water level so it can detect the onset of rising water levels. But with Poteet's design this is generally impossible because of the steep sides of the river bed and/or deep water. Thus, Poteet's design limitations severely restrict the alarm to use only in shallow rivers with gentle slopes, developed residential or commercial environments with docks, boardwalks, or boat launch facilities, or rare natural river environments that just happen to have relatively flat terrain reasonable close to the desired sensor height.

Yet another device is disclosed in U.S. Pat. No. 3,662,131 issued to Leistiko, wherein there is disclosed an electrical liquid level sensor for detecting the level of water or other liquids in a vessel. This unit was designed for a controlled environment, and as such, failed to disclose a means of securing the device to any surface. The electrical system of Leistiko must be permanently secured to the particular vessel, and as such the sensor has no housing for protection. Should Leistiko's device be located in a non-controlled environment, debris, and the like, could easily contact the non-protected sensor. The contact could cause damage and inherently render the device useless. Hence, Leistiko fails to disclose a portable unit which can be secured to any surface in any desirable position.

Accordingly, it is seen that none of these previous efforts provide the benefits intended with the present invention, such as providing a water level detection and alarm unit which is lightweight, compact and is versatilely adapted to be removably secured to any surface, terrain, or the like. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, contains a minimum number of functioning parts, is economical to manufacture, assemble, test and uses only readily available materials of construction.

SUMMARY OF THE INVENTION

The present invention provides a portable water level detector or flood alarm device which is adapted to be permanently or removably secured to any surface, terrain, or the like, at any angular position. This option of attaching onto any surface at any angular placement provides for a device which can accurately and adequately activate a warning means once water reaches a pre-selected level.

The device of the present invention comprises a housing which can completely or partially maintain an alarm system, a mounting means for maintaining and leveling the housing, and an attaching means for attaching the device to any surface.

The alarm system comprises conventional components, including a conventional mercury activated float switch, float sensor, or the like, which is pivotally mounted in the housing. Coupled to the float switch, float sensor, or the like is a conventional power source, such as a battery, and a conventional warning means, such as a light source, audible alarm, or a combination thereof. The power source and warning means can be located exteriorly from the housing.

The housing includes at least one opening or channel for rendering an entrance means for the water and at least one opening for venting air in the chamber. The housing maintains at least the float switch, float sensor or the like and must be installed horizontal or parallel to the water so the float will operate freely. Accordingly, water enters the unit via the entrance means and rotates the conventional float switch, float sensor, or the like, until the switch closes. The closure will cause a closed circuit to exist and enable activation of the warning means (the light source, audible means, or combination thereof).

The mounting means includes various embodiments. In one embodiment, the mounting means compromises a U-shaped housing support member which is pivotally coupled to a U-shaped base. In this embodiment, the housing is directly secured to the U-shaped housing support member, and, thus, rotates as the U-shaped housing support member rotates. To conserve materials of construction, the U-shaped housing support member of the mounting means can be eliminated entirely. In this second embodiment, the U-shaped base is pivotally coupled directly to the housing. These two designs and configurations of the mounting means provide two different methods for pivotally coupling the housing to the mounting base via a pivot means. This design and configuration of the mounting means provides for the housing to be pivotally secured to the base via a pivot means. The various embodiments of the mounting means will enable the housing to be adjusted angularly and render the housing to be positioned horizontally and parallel to the water. The conventional float switch axis of rotation will inherently become horizontal and parallel with respect to the water due to its pivotal attachment to the housing.

For securing the unit to any surface there is provided an attaching means. The attaching means comprises a pair of flanges, oppositely affixed to the U-shaped base of the mounting means. Extending angularly through each flange is at least one elongated aperture. This elongated aperture is adapted to removably receive anchor pins. Elongation of the aperture provides a means to secure the anchor pins at the prescribed angle and prevents them from rotating about a horizontal axis. The structure and angular placement of the apertures provides for a unit which will be affixed securely fastened to any earth surface, terrain or the like.

Hence, to utilize the device of the present invention in a portable mode, the user merely places the base on the earth surface where the long axis of the float switch housing will be roughly horizontal and inserts the anchor pins into the apertures. Once inserted, the unit is secured to the surface and the user rotates the support member so the float switch's housing is approximately horizontal with respect to the water. The unit is then secured in the desired angular or level position by fastening the pivot means. The unit is ready for utility.

Accordingly, it is the object of the present invention to provide for a water level detector or flood alarm device which will overcome the deficiencies, shortcomings, and drawbacks of prior water level detector or flood alarm devices and methods thereof.

Still another object of the present invention is to provide for a water level detector or flood alarm device that is compact and portable, and which includes a means of attaching to any surface, terrain or the like.

Yet another object of the present invention is to provide for a water level detector or flood alarm device that is versatile and which will enable the user to adjust the unit to any angular position. Adjusting the angular position provides for a unit which can be attached on any angular slope for rendering a unit that can successfully be utilized on the side wall of any river bed, steep river bank, or the like or permanently installed on docks, posts, walls, or the like.

Still a further object of the present invention, to be specifically enumerated herein, is to provide a water level detector or flood alarm device in accordance with the preceding objects and which will conform to conventional forms of manufacture, be of simple construction and easy to use so as to provide a device that would be economically feasible, long lasting and relatively trouble free in operation.

Although there have been many inventions related to a water level detector or flood alarm device, none of the inventions have become portable, sufficiently compact, low cost, and reliable enough to become commonly used. The present invention meets the requirements of the simplified design, versatile use, lightweight, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

DESCRIPTION OF THE PREFERRED EMBODIMENTS

Figure 1:
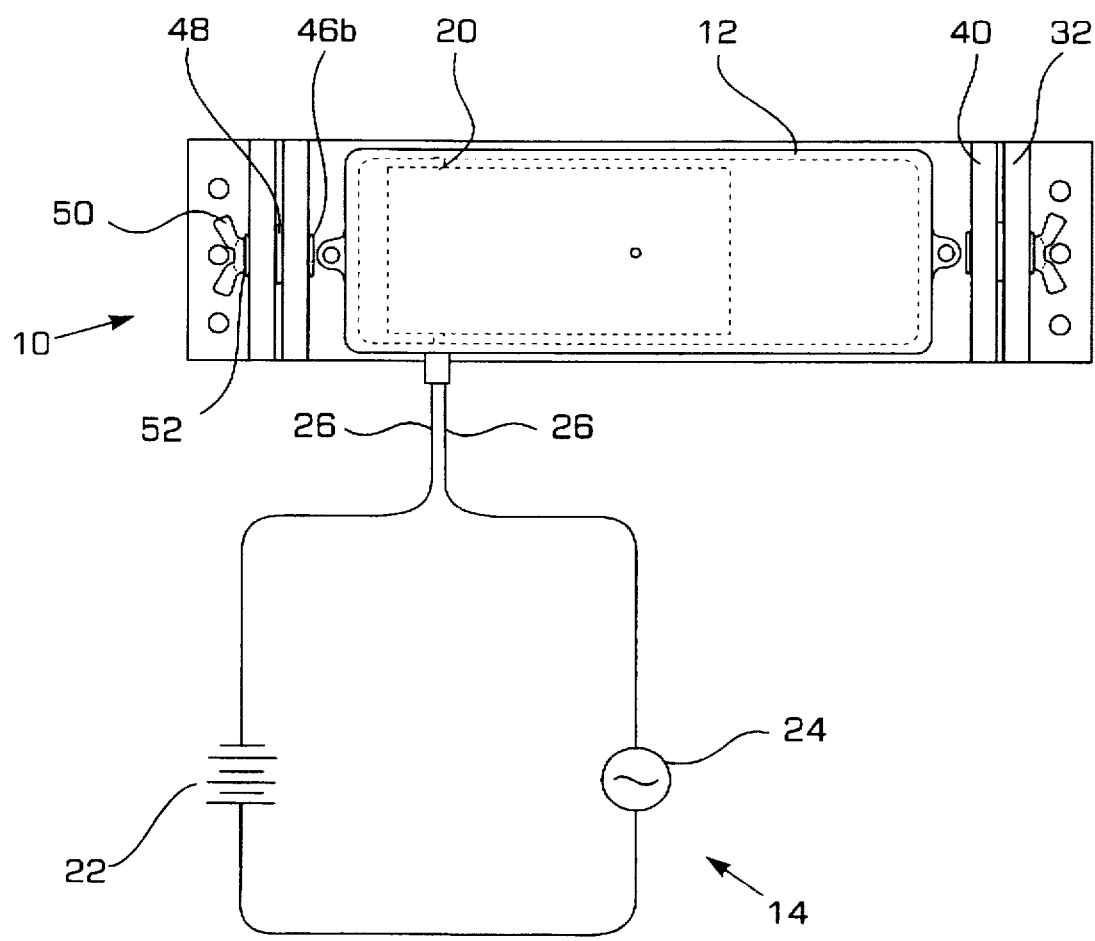
FIG. 1 is a schematic representation of the water level detector or flood alarm device of the present invention wherein a top view of the present invention is illustrated.

With reference to drawings, and in particular to FIGS. 1, 2 and 3 thereof, the water level detector or flood alarm device of the present invention will be described. As seen, the water level detector or flood alarm device 10 of the present invention comprises a housing 12, an alarm means 14, a mounting means 16a, and an attaching means 18.

The alarm means 14 comprises a conventional mercury activated float switch 20 mounted interiorly to the housing 12. Other conventional float devices or types of liquid sensors can be used which will activate a switch upon contact with water. It is to be understood that a conventional mercury activated float switch, Sure Bail® manufactured by DELSON INDUSTRIES, has been used to produce favorable results and this conventional mercury float switch is only one example of a suitable sensor that could be used with the water level detector or flood alarm device of the present invention. It is further contemplated that appropriate modifications of the attachment of the conventional water detecting devices 20 to the housing 12 can be done in order for the invention to be suited to receive other conventional water detecting devices within the scope of skill of the ordinary artisan.

Coupled to the float switch 20 is a power supply 22, such as a battery, and a warning means 24, such as a light source, an audible alarm means, or a combination thereof. This will provide for the float switch 20 to be in series with the battery and warning means. As rising water rotates the float, the switch 20 will close, as illustrated, for forming a closed circuit. The closed circuit will activate the warning means 24 via the power source 22. The electrical conduits 26 used to couple the switch 20 to the power supply and warning means can be any desired length. Optionally, the electrical conduits 26 can include connectors 28 for providing for the power supply 22 and warning means to be removably secured to the switch 20. This will provide for a unit which can be disassembled easily and quickly and made compact for storage and transport.

In yet another embodiment, the conduits 26 can be coupled to a transmitter while a receiver would be coupled to the warning means 24. Upon activation of the switch 20, current is transported to the transmitter. The transmitter sends a signal to the receiver for activating the warning means.

The conventional mercury activated float switch 20 is maintained within the housing 12 to provide for the float switch to be pivotally located within the housing. Pivotal attachment is dependent upon the type and style of conventional float switch devices which are utilized. Some conventional devices will be pivotally housed within its own casing while other conventional devices need not have the pivotal mechanism in order to be utilized. Hence, it is seen that the conventional float switch is secured and maintained within the housing.

The housing 12, as seen, includes at least one opening 30a for allowing water to efficiently enter and exit the housing 12. It is noted that this opening is designed to enable water to enter, but must be sized to prohibit debris, such as leaves and the like, from entering the housing. An additional opening 30b is located in proximity to the upper area of the housing to vent air inside the chamber (interior area of the housing) as the water rises and falls. To prevent insects and smaller debris from entering the housing, a screen (not illustrated) can be added to cover the at least one opening 30a.

Secured to housing 12 is the mounting means 16a. The first embodiment for the mounting means is illustrated in further detail in FIGS. 2 and 3. As seen in these figures, the mounting means 16a includes a U-shaped base 32 and a U-shaped housing support member 40 with the U-shaped base 32 having a lower planar member 34 and two vertically extending members 36 situated at opposite ends of the lower planar member 34.

Pivotally affixed via a pivot means 38 to the U-shaped base 32 is the U-shaped housing support member 40. This second U-shaped member 40 includes a lower planar member 42 having two vertically extending members 44 situated at opposite ends of the lower planar member 42. Secured to the upper surface of the lower planar member 42 of the second U-shaped member or housing support member 40 is the housing 12.

As seen in FIGS. 3, 5, 6, and 8, the water entrance and exit means or opening 30a is located along the side wall of the housing in proximity to the lower area of the housing while opening 30b is located in proximity to the top area of the housing.

Attachment of the U-shaped housing support member 40 to the U-shaped base 32 occurs at any point along the vertically extending members 44 and 36, respectively, via the pivot means 38. This pivot means enables easy pivotal movement of the U-shaped support member 40 with respect to the U-shaped base. This pivot means 38 also enables a secure angular placement of the U-shaped housing support member 40 to the U-shaped base 32. Accordingly, the desired position of the U-shaped housing support member 40 with respect to the U-shaped base 32 can be locked in a secured position via the pivot means 38 to inherently provide for the housing to be parallel and horizontal with respect to the water.

The pivot means 38 comprises bolts, spacers or washers, and wing nuts. For maintaining the pivot means 38, each vertically extending member, 36 and 44, include through holes (illustrated in FIG. 2, but not labeled). Extending through each set of through holes is a bolt 46a, such as a carriage bolt. The head 46b of the bolt 46a faces the housing 12 (see FIG. 1). Situated on the bolt and between the vertically extending member 36 of the base 32 and the vertically extending member 44 of the support member 40 is a washer or spacer 48. This washer or spacer 48 provides a reduction in friction during rotation of the support member. Located on the opposite end of the head of the bolt is a wing nut 50. The wing nut enables the secure placement of the support member 40. Accordingly, the wing nut 50 is rotated counter clockwise to loosen the pivot means 38 to render the support member 40 to rotate freely with respect to the base 32. Once a desired position is obtained, the wing nut 50 is rotated clockwise to tighten and secure the support member 40 to the base 32. A lock washer 52 may be used to lock and secure the pivot means by providing proper tension between the washer 52 and the bearing surface of the U-shaped base member. Additional washers may be used for assisting in the proper distribution of pressure as well as preventing damage to the outer surface of the vertically extending member 36 of the base 32. If a lock washer is utilized, the additional washers will be located between the lock washer and outer surface of the vertically extending member of the base.

For securing this device to any surface, an attaching means 18 is provided. The attaching means includes flanges 54 which extend outwardly and perpendicularly from each vertically extending member 36 of the U-shaped base 32 of the mounting means. For temporary or portable use, the flanges 54 each include at least one elongated aperture 56 which extends through the flange at an acute angle, preferably and approximately 40–80 degrees. As shown in the figures, the oppositely located elongated apertures are designed and configured to extend towards each other. This will provide for the apertures of the first flange and the apertures of the second flange to extend downwardly towards one another.

Removably secured to each aperture is a conventional anchoring pin 58. It is to be understood that anchoring pins having alternative embodiments, such as skewer stakes, nail pegs, corkscrew anchors, auger anchors, and the like, can be successfully utilized with the present invention. The design and configuration of other anchoring pins, such as the use of corkscrew anchors instead of tent pins, may increase the holding power of the device, but they are usually larger and heavier. The combination of the flange, the elongation and angular placement of the aperture, and the anchoring pins provides for a sturdy and sound attaching means which can successfully secure the device 10 to any surface, ground, terrain or the like. The angular placement provides for the convergence effect, while a resisting means, or the elongation of the apertures, prevents the rotation of the anchor pins even when extraction is attempted. Accordingly, it is seen that the attaching means includes an angular convergence means for providing converging attachment and a resisting means which will inherently provides a means of resisting gravitational forces and forces of snags and moving water. This will render the housing to be soundly and securely affixed to any type surface and at any inclination.

Hence, to utilize the device described above, the user merely attaches the base 32 to a surface via the attaching means 18 so the long axis of the float switch housing is nearly horizontal. Once secured, the individual loosens the pivot means 38 and adjusts the support member 40 so the housing 12 is approximately level. This will provide for both the housing and axis of rotation of the conventional float switch to be horizontal with respect to the water. When the housing is leveled, with respect to the water, the pivot means is tighten to secure the position of the housing support member 40. Verification of the coupling of the power supply to the switch and warning means is the next step. Once arranged, the unit is set for use.

Figure 4:
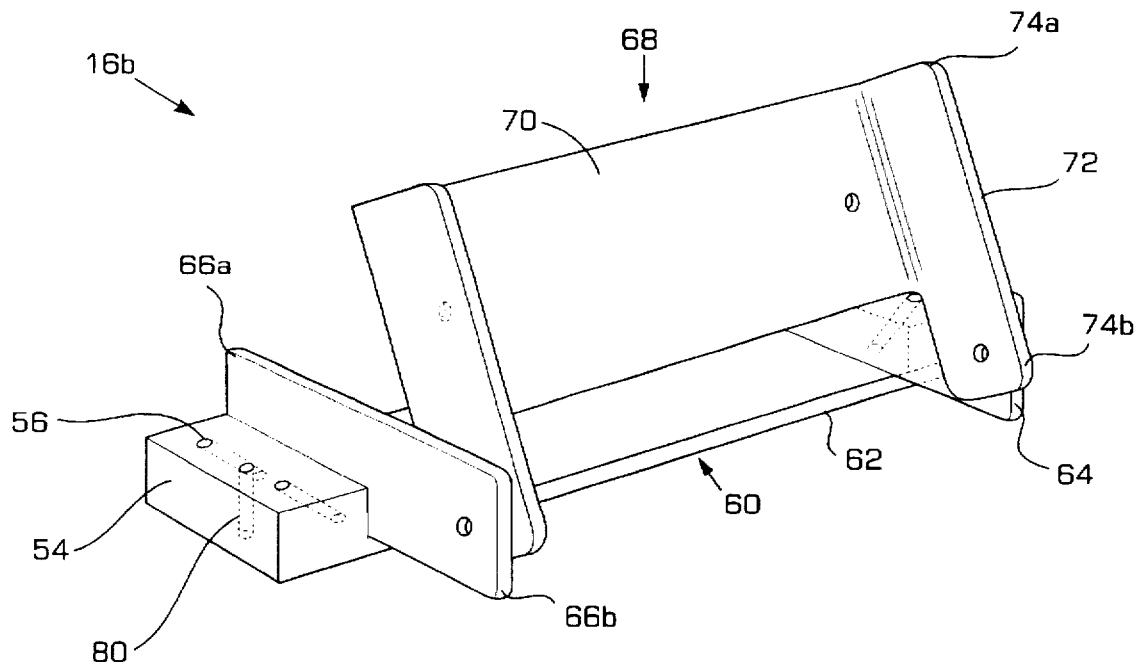
FIG. 4 is a perspective view of the second embodiment of the mounting means used in the water level detector or flood alarm device of the present invention.
Figure 5:
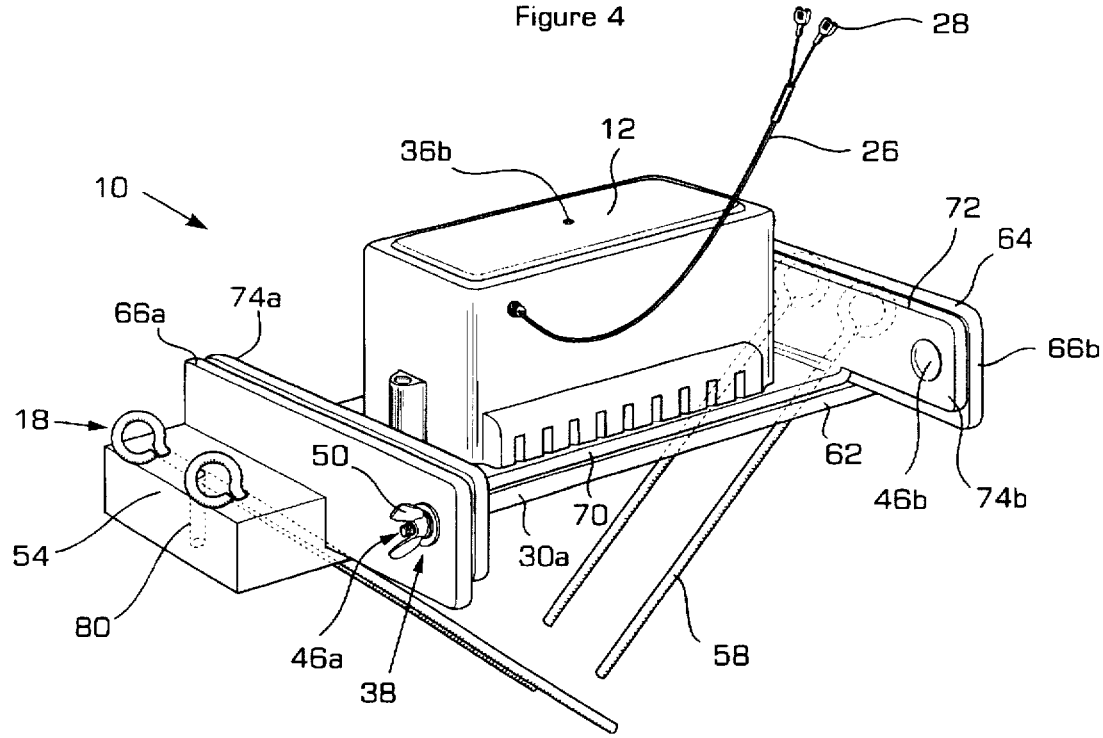
FIG. 5 is a perspective view of the water level detector or flood alarm device of the present invention including the second embodiment of the mounting means having a side pivot.

A second embodiment of the mounting means 16b which pivots on the side is illustrated in further detail in FIGS. 4 and 5. This embodiment places the center of gravity of the pivoting components (12 and 40) closer to the center of the attaching means 18 which reduces the leveraged weight the attaching means 18 must support, especially when installed on steep slopes. As seen in these figures, the housing, alarm means, and attaching means are similar in structure, configuration, and design as discussed above and need not be disclosed in further detail.

The second embodiment for the mounting means 16b includes a substantially U-shaped base 60 having a lower planar member 62. Located at opposite ends of the lower planar member 62 are vertically extending members 64. These vertically extending members 64 each include opposite ends 66a and 66b. The first end 66a of the vertically extending member 64 is aligned with the base while the second end 66b extends slightly outwardly to the side of the base.

Pivotally secured to the base 60 via a pivot means 38 is a substantially U-shaped housing support member 68 having a lower planar member 70. Located at opposite ends of the lower planar member 70 are vertically extending members 72. These vertically extending members 72 each include opposite ends 74a and 74b. The first end 74a of the vertically extending member is aligned with the planar member 70 while the second end 74b extends slightly outwardly to the side of the base.

Extending through the second end of each paired vertically extending members 64 and 72, respectively, is the pivot means 38. The configuration of this embodiment of the mounting means 16 reduces the leveraged weight the attaching means 18 must support when installed on a sloping surface. Utilization for this embodiment is similar as discussed in the first embodiment as illustrated in FIGS. 1–3.

Figure 6:
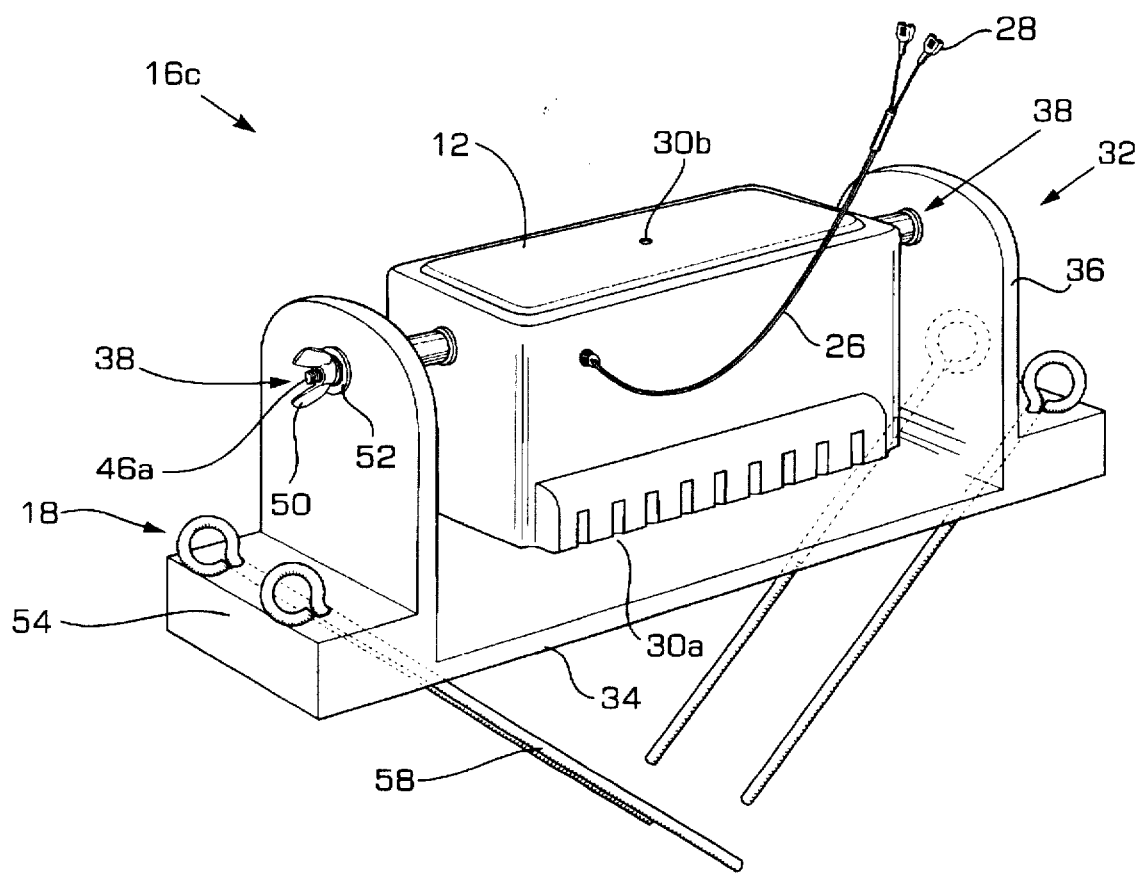
FIG. 6 is a perspective view of the water level detector or flood alarm device of the present invention including a third embodiment of the mounting means.

For conservation of material and reduction in weight and size, the mounting means can be altered to provide for a third embodiment of the mounting means 16c which is illustrated in further detail in FIG. 6. As seen in this figure, the alarm means and attaching means are similar in structure, configuration, and design as discussed in the first embodiment and need not be disclosed in further detail.

This third embodiment includes a U-shaped base 32 having a lower planar member 34 and two vertically extending members 36. Pivotally affixed via a pivot means 38 to the two vertically extending members of the U-shaped base is the housing 12. This embodiment eliminates the U-shaped housing support member 40 and, thus, uses less material to inherently provide a unit which is more economical, compact and lightweight. Utilization occurs in the same manner as for the first embodiment and as discussed for FIGS. 1–3. Optionally, this U-shaped base and housing can also be reconfigured to pivot on the side similar to the structure as illustrated in FIGS. 4 and 5.

For added holding power or security of the mounting means, the above-identified embodiments can include the alteration of the mounting means 18. This alteration is illustrated in further detail in FIGS. 7 and 8. As seen in these figures the U-shaped base 60 further includes oppositely located additional flanges 76 having elongated apertures 78 extending therethrough. The elongated apertures 56 of the first set of flanges 54 would be oriented approximately 90 degrees to the elongated apertures 78 of the additional flanges 76. The elongated apertures of the additional flanges extend, preferably, an acute angle therethrough. As shown in the figures, the oppositely located elongated apertures 78 are designed and configured to extend towards each other. This will provide for the apertures of the first flange and the apertures of the second flange to extend downwardly, with respect to the surface, and towards one another. Anchor pins are adapted to be received within the holes. Once inserted therethrough, the ends of the pins will converge below the center of the mounting means, making it difficult for removal of the device of the present invention, and inherently, providing a more sturdy attachment to the ground.

For conservation of materials or for aesthetic reasons, the flanges can extend the entire length of the lower planar member 60 or, optionally, may partially extend the length of the lower planar member, as illustrated.

Figure 2:
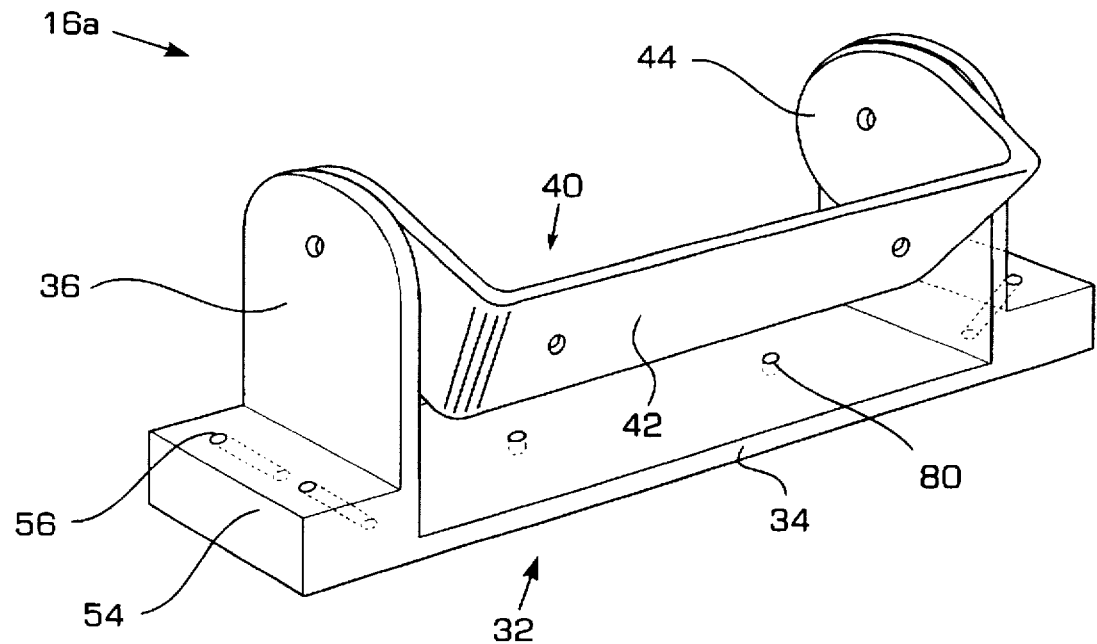
FIG. 2 is a perspective view of the first embodiment of the mounting means used in the water level detector or flood alarm device of the present invention.
Figure 3:
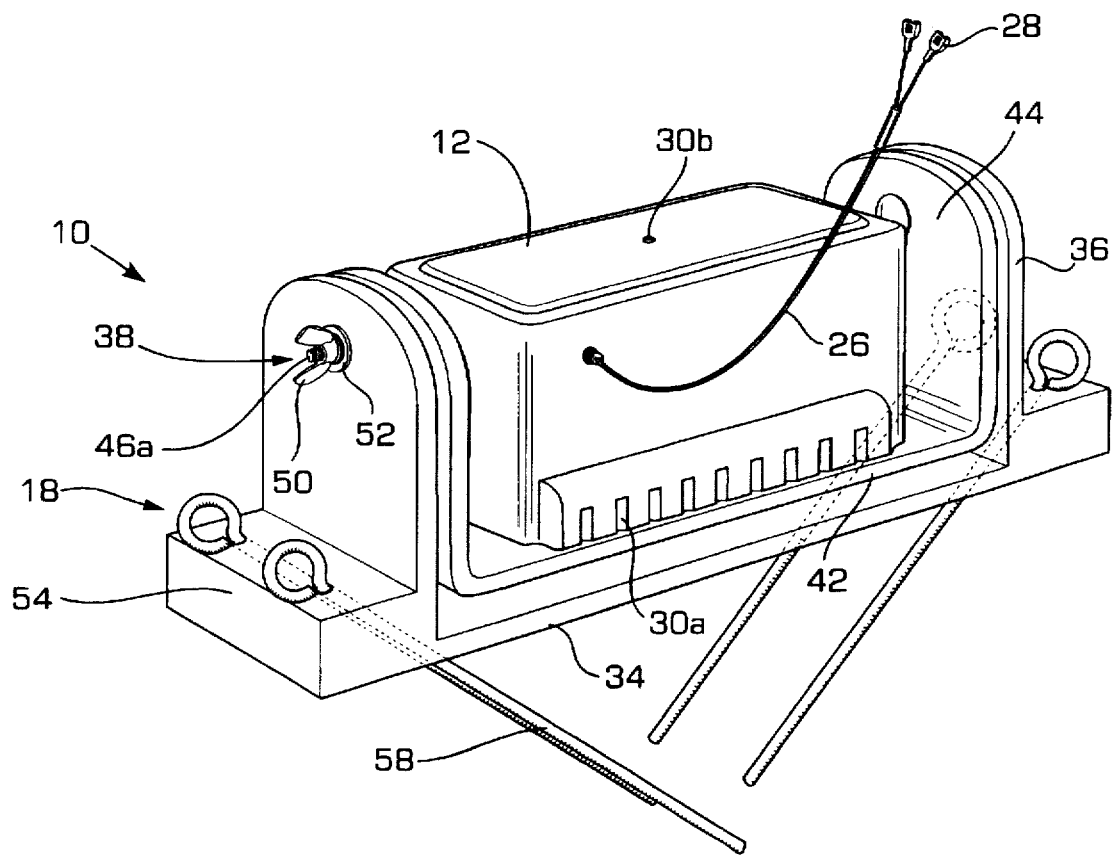
FIG. 3 is a perspective view of the water level detector or flood alarm device of the present invention including the first embodiment of the mounting means having a center line pivot.

Utilization occurs in the same manner as for the first embodiment and as discussed for FIGS. 1–3. Optionally, these additional flanges can be used with the U-shaped bases illustrated in FIGS. 1–3 and 6.

It is noted that the attaching means of the first, second and third embodiments of the present invention can be altered to include screw holes 80, illustrated and labeled in the figures, located in the flange members 54 and 76. These screw holes will render a fixed installation of the water level detector or flood alarm device of the present invention. The use of the screw holes is ideal for use on a wooden surface, such as a dock, post or the like.

The above screw holes could also be enlarged and used to attach the present invention to a modified corkscrew anchor device such as the Awing Arm Anchor manufactured by MOONGLOW ENTERPRISES. This device consists of a conventional corkscrew anchor with a mounting plate centered and fixedly secured perpendicular to its top in lieu of the normal handle. This mounting plate contains slots on both sides of the center that secure and permit lateral adjustment of the two attaching bolts which could be used to secure the present invention to the Awning Arm Anchor or the like. After the anchor is screwed into the river bank, the present invention could be attached as described above and utilized in the manner appropriate for the embodiment used. Optionally, this anchor can be directly attached to the housing. This heavier, stronger, and larger attaching means would be ideal for heavy duty use where portability is desired but weight and size are not critical.

It should also be noted that in the case of the first, second, and third embodiments, illustrated in FIGS. 1-3, FIGS. 4 and 5, and FIG. 6, respectively, the conventional float switch 20 and housing unit 12 can be removed from its U-shaped support mount or mounting means 16 and installed directly when a permanent installation is desired and when the mounting surface is level and there is no need for angular adjustment.

The effectiveness of formulation made in accordance with the teaching of the present invention, in particular to the attaching means, is illustrated by the following examples and field test.

EXAMPLES OF HOLDING POWER OF ATTACHING MEANS

| Test Site | Riverbank Slope | Tensional Force (lbs.) | Ground Condition |
|---|---|---|---|
| 1 | 10 degrees | 15 | Sandy, wet and within three inches of water edge |
| 2 | 40 degrees | 29 | Sandy, damp, and about two feet above the water level |
| 3 | 60 degrees | 24 | Sandy, damp, and about five feet above the water level |
| 4 | 75 degrees | 22 | Sandy, damp, about 3 feet upstream from test #3 and five feet above the water level |
| 5 | 80 degrees | 16-23 | Sandy, wet, and about five inches above the water level |
| 6 | 20 degrees | 26 | Damp, loose sand, several feet above water level |
| 7 | 20 degrees | 14 | Dry, loose sand, several feet above water level |

Notes:
1. Tensional Force is the minimal force perpendicular to the incline of the river bank (slope) required to pull the present invention free.
2. At site #5, the present invention was loosened at 16 lbs. then apparently hung on roots until it dislodged at 23 lbs. of tension.

The test was performed on the Sopchoppy River in Florida because its banks are usually high and very sandy, and these conditions generally present the most difficulty in securing devices to the ground. The embodiment illustrated in FIG. 3 was utilized having a pair of apertures extending through the flanges at an angle of 60 degrees. The thickness or height of the flanges was ¾ of an inch. The pins inserted into these apertures were conventional and approximately 7½ inches in length.

The minimum tensional force required to completely removed the device from the ground was measured as it was slowly pulled straight out of its installed position in a direction perpendicular to the incline or slope of the river bank. As the data indicates, wet mushy sand near the water level and dry loose sand higher on the river bank were associated with the lowest resistance or holding powers of 15 and 14 pounds of tension, respectively.

Since the device and its anchor pins do not float, the only force that would act on it in flooded conditions besides its own weight would be the dynamic pressure of the moving water when submerged or from snags that might float past. But measurement of these actual forces was not attempted because it would depend on too many highly variable factors such as the speed of the current, depth of the water over the device, turbulence, shape and size of snags, existence of roots in the sand, etc. none of which could be easily produced, controlled, or measured for such a limited study. However, it is not unrealistic to assume that the tensional force required to pull the device outward perpendicular from the ground, as measured in this test, would be less that the holding power that would result from the digging and shearing action created by the 60 degree angle of the anchor pins when the device is pushed horizontally downstream by moving water or snags. In fact huge resistance would be created where underground roots are encountered, especially near the surface, and these conditions are quite common along river banks.

Therefore, it is concluded by inference that 14 pounds represents the approximate minimum force that would be required to dislodge the device from an installed position. It was further concluded that since the measurements were made on sandy riverbank conditions, which generally exhibit low holding powers, the resistive force or holding power would be greater for most other types of denser, heavier soil conditions.

Figure 7:
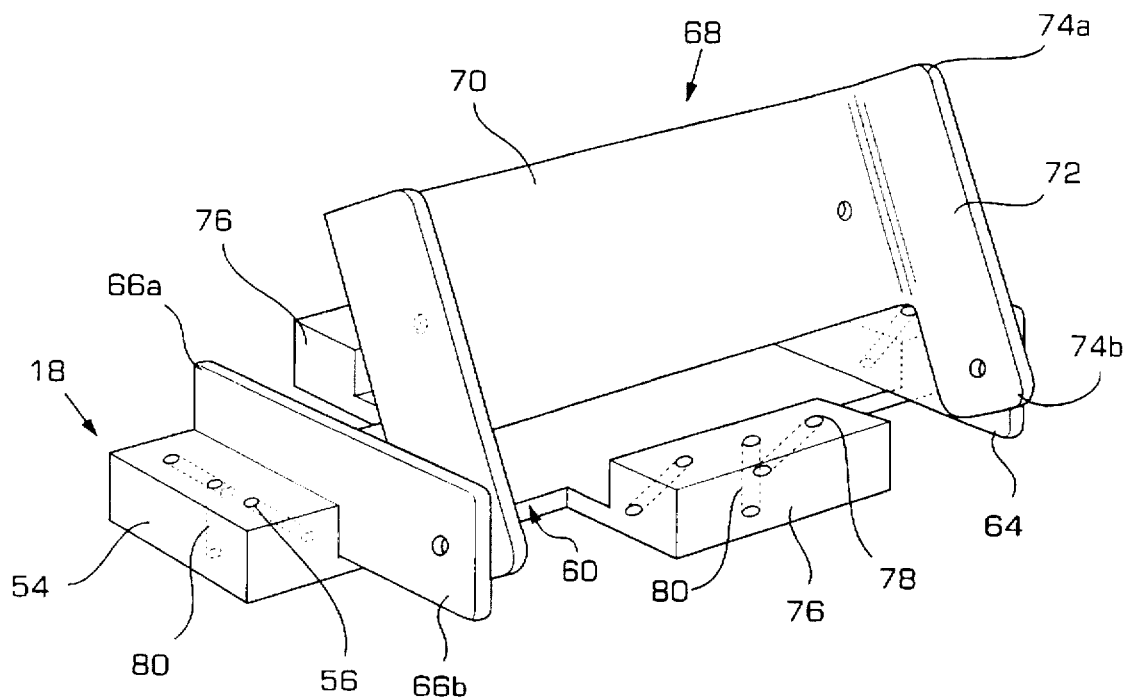
FIG. 7 is a perspective view of an alternative embodiment for the mounting means which can be used in the water level detector or flood alarm device of the present invention.
Figure 8:
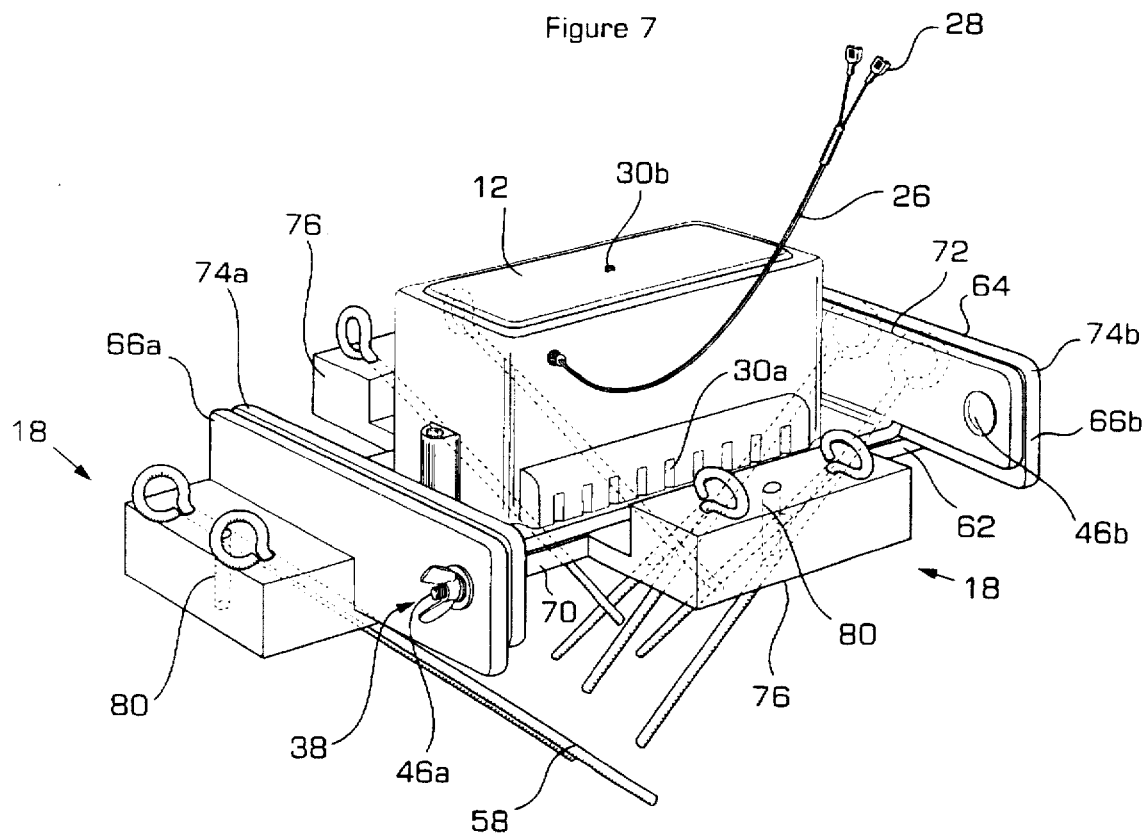
FIG. 8 is a perspective view of the water level detector or flood alarm device of the present invention including an alternative embodiment for the base which can be used with the first, second or third embodiment of the present invention Similar reference numerals refer to similar parts throughout the several views of the drawings.

It should be noted that the holding power of the device can be increased by adding additional flanges with elongated apertures to the other two sides of the support base, as discussed and illustrated in FIGS. 7 and 8.

The holding power of the attaching means can also be increased by utilizing other types of conventional anchors, such as, but not limited to, skewer stakes, nail pegs, corkscrew anchors, auger anchors, and the like, but these devices are usually larger and heavier than the anchor pins shown in the present invention.

The components used with the present invention are typically fabricated from non-corrosive materials to provide a device which will not rust nor corrode in time.

The present invention 10, as illustrated in FIGS. 1-8 is ideal for use by campers, boaters, armed forces, disaster aid and rescue workers, homeowners, canoeing and rafting outfitters, and other businesses with temporary or permanent operations on or near a river because their activities and possessions are often very susceptible and vulnerable to the dangers of flood conditions. This alarm device provides the capability to all of these potential users to be forewarned when the trend of rising water first begins; thus greatly reducing the risk to them and their possessions.

The unique design, structure, and configuration of the attaching means enables users to install the float switch on practically any surface ranging from sandy river banks to wooden retaining walls that may be inclined at any angle or slope up to 90 degrees. And since the unique mounting means permits angular adjustment of the float switch housing, it can be leveled parallel and horizontal to the water for accurate and adequate placement of the device for successfully activating the warning means. Thus warned before flooding actually begins, the users will have more time to increase vigilance, move to higher ground, or evacuate.

The device can also be used and attached to docks, piers, posts or the like via the centrally and perpendicularly located aperture situated in the attaching means or base for accepting a screw or the like. This will provide for an alternative usage and environment for the device of the present invention.

While the invention has been particularly shown and described with reference to an embodiment thereof, it will be understood by those skilled in the art that various changes in form and detail may be made without departing from the spirit and scope of the invention.

I claim:

1. An alarm device for detecting a predetermined level of water comprising:

a liquid sensor switch device contained within a protective housing;

a warning means and power supply coupled to a liquid sensor switch;

a pivot means;

a mounting means maintains said housing and said mounting means provides pivotal and rotational movement of said housing via said pivot means for enabling said housing and said liquid sensor switch device to be mechanically adjusted and positioned level and horizontal with respect to the water surface, said pivot means enables mechanical positioning of said mounting means for providing pivotal and rotatable positioning of said housing and said liquid sensor switch device, and said pivot means provides for said mounting means to be in a fixed and secured position; and an attaching means attaches said mounting means to a surface.

2. An alarm device as in claim 1 wherein said warning means includes an audible alarm means, a light source, or a combination thereof.

3. An alarm device as in claim 1 wherein said housing includes at least one opening for allowing water to efficiently enter and exit said housing, and said housing includes an additional opening, located above said at least one opening, for venting interior air as said water rises and falls inside said housing.

4. An alarm device as in claim 3 wherein said at least one opening is covered with a screen.

5. An alarm device as in claim 1 wherein said attaching means includes a first flange extending outwardly from a first end or side of said mounting means and a second flange extending outwardly from a second end or side of said mounting means, at least one aperture is angularly disposed in said first flange and said second flange, said at least one aperture removably receives an anchor pin.

6. An alarm device as in claim 5 wherein said first flange is located opposite from said second flange, said at least one aperture extends into said first flange at an angle of 40–80 degrees with respect to a lower surface of said first flange, and said at least one aperture extends into said second flange, in an opposite direction and at an angle of 40–80 degrees with respect to a lower surface of said second flange.

7. An alarm device as in claim 6 wherein each of said at least one aperture is elongated having a sufficient depth to prevent breakage of said flange and rotation in a plane perpendicular to the flange of said anchor pin within said at least one aperture.

8. An alarm device as in claim 5 wherein said first flange is located opposite from said second flange, said attaching means further includes a third flange extending outwardly from a third end or side of said mounting means and a fourth flange extending outwardly from a fourth end or side of said mounting means, said third flange is located opposite from said fourth flange, at least one aperture is angularly disposed in said third flange and said fourth flange, said at least one aperture removably receives an anchor pin.

9. An alarm device as in claim 8 wherein said at least one aperture of said third flange extends into said third flange at an angle of 40–80 degrees with respect to a lower surface of said third flange, and said at least one aperture of said fourth flange extends into said fourth flange, in an opposite direction and at an angle of 40–80 degrees with respect to a lower surface of said second flange, and said at least one aperture in said first flange, said second flange, said third flange, and said fourth flange extends towards a center below said mounting means.

10. An alarm device as in claim 5 wherein said anchor pin is selected from the group consisting of tent pins, skewer stakes, nail pegs, corkscrew anchors, and auger anchors.

11. An alarm device as in claim 1 wherein said mounting means comprises a U-shaped base having a lower planar member and two vertically extending members situated at opposite ends of the lower planar member, said housing is pivotally secured to said two vertically extending members.

12. An alarm device as in claim 1 wherein said mounting means comprises a U-shaped base having a lower planar member and two vertically extending members situated at opposite ends of the lower planar member, a U-shaped support member having a lower planar member and two vertically extending members situated at opposite ends of the lower planar member is pivotally secured to said U-shaped base, said pivot means secures said vertically extending members of said U-shaped support member to said vertically extending members of U-shaped base, and said housing is secured to said U-shaped support member.

13. An alarm device as in claim 12 wherein said vertically extending members of said U-shaped support member and said vertically extending members of said U-shaped base each have a first end and a second end, said first end of said vertically extending member of said U-shaped support member and said U-shaped base extends outwardly from said lower vertically extending member of said U-shaped support member and said U-shaped base extends outwardly from said lower planar member of said U-shaped base to provide for an extension, and said pivot means extends through said extension of said U-shaped support member and said U-shaped base.

14. An alarm device as in claim 1 wherein a transmitter is coupled to said liquid sensor switch device and a receiver is coupled to said warning means, wherein upon activation of said liquid sensor switch device, activation occurs with said transmitter, said transmitter transmits signals to said receiver for activating said warning means.

15. An alarm device for detecting a predetermined level of water comprising:

a liquid sensor switch device contained within a protective housing;

a warning means and power supply coupled to a liquid sensor switch;

a mounting means maintains said housing;

an attaching means removably engages a surface for enabling said housing to be mounted to said surface; and said attaching means includes an affixed angular convergence means and a resisting means, said affixed angular convergence means provides secured attachment to said surface and said resisting means provides a means of resisting gravitational forces and forces of snags and moving water for allowing said housing to be soundly and securely affixed to said surface.

16. An alarm device as in claim 15 wherein said mounting means maintains said housing and said mounting means provides pivotal and rotational movement of said housing via a pivot means for enabling said housing and said liquid sensor switch device to be mechanically adjusted and positioned parallel and horizontal with respect to the water level, said pivot means enables mechanical positioning of said mounting means for providing pivotal and rotatable positioning of said housing and said liquid sensor switch device, and said pivot means provides for said mounting means to be in a fixed and secured position.

17. An alarm device as in claim 15 wherein said attaching means includes a first flange extending outwardly from a first end or side of said mounting means and a second flange extending outwardly from a second end or side of said mounting means, at least one aperture is angularly disposed in said first flange and said second flange, said at least one aperture removably receives an anchor pin, said aperture angularly disposed constitutes said angular convergence means and said pin constitutes said resisting means.

18. An alarm device as in claim 17 wherein said first flange is located opposite from said second flange, said at least one aperture extends into said first flange at an angle of 40–80 degrees with respect to a lower surface of said first flange, and said at least one aperture extends into said second flange, in an opposite direction and at an angle of 40–80 degrees with respect to a lower surface of said second flange.

19. An alarm device as in claim 17 wherein said first flange is located opposite from said second flange, said attaching means further includes a third flange extending outwardly from a third end or side of said mounting means and a fourth flange extending outwardly from a fourth end or side of said mounting means, said third flange is located opposite from said fourth flange, at least one aperture is angularly disposed in said third flange and said fourth flange for removably receiving an anchor pin.

20. An alarm device as in claim 17 wherein said anchor pin is selected from the group consisting of tent pins, skewer stakes, nail pegs, corkscrew anchors, and auger anchors.

21. An alarm device for detecting a pre-determined level of water comprising:

a liquid sensor switch device contained within a protective housing and coupled to a warning means;

a pivotal mounting means maintains said housing;

said pivotal mounting means provides pivotal and rotational movement of said housing for enabling said housing and said liquid sensor switch device to be mechanically adjusted and positioned level and horizontal with respect to the water surface.; and an attaching means removably engages a surface for enabling said housing to be mounted to said surface;

said attaching means includes a convergence means for providing attachment to said surface and providing a means of resisting gravitational forces and forces of snags and moving water for allowing said housing to be soundly and securely affixed to said surface.

* * * * *